US012618719B2

(12) United States Patent
Pook

(10) Patent No.: US 12,618,719 B2
(45) Date of Patent: May 5, 2026

(54) METHOD FOR DETERMINING SENSOR TYPES AND SENSOR WIRING

(71) Applicant: ABB Schweiz AG, Baden (CH)

(72) Inventor: Stefan Pook, Minden (DE)

(73) Assignee: ABB Schweiz AG, Baden (CH)

( * ) Notice: Subject to any disclaimer, the term of this patent is extended or adjusted under 35 U.S.C. 154(b) by 458 days.

(21) Appl. No.: 18/173,138

(22) Filed: Feb. 23, 2023

(65) Prior Publication Data

US 2023/0266176 A1      Aug. 24, 2023

(30) Foreign Application Priority Data

Feb. 23, 2022      (EP) ..................................... 22158306

(51) Int. Cl.
*G01K 7/13*          (2006.01)
*G01K 7/22*          (2006.01)
*H04B 1/02*          (2006.01)
(52) U.S. Cl.
CPC ................. *G01K 7/13* (2013.01); *G01K 7/22* (2013.01); *H04B 1/02* (2013.01)
(58) Field of Classification Search
CPC ... H04B 1/02; G01K 7/13; G01K 7/22; G01K 7/02; G01K 7/026; G01K 7/16; G01K 7/00; G01K 7/24
See application file for complete search history.

(56) References Cited

U.S. PATENT DOCUMENTS

| | | | | |
|---|---|---|---|---|
| 4,841,286 A | * | 6/1989 | Kummer ................ | G01K 7/026 |
| | | | | 374/E7.007 |
| 7,658,539 B2 | | 2/2010 | Engelstad | |
| 10,135,470 B2 | | 11/2018 | Gopisetti et al. | |
| 2018/0238743 A1 | * | 8/2018 | Rud ......................... | G01K 7/16 |

FOREIGN PATENT DOCUMENTS

| | | | | | |
|---|---|---|---|---|---|
| CN | 106092352 A | * | 11/2016 | ............... | G01K 7/22 |
| CN | 111721445 A | | 9/2020 | | |
| DE | 102020105475 A1 | | 10/2020 | | |
| EP | 2102616 B1 | * | 1/2018 | ............. | G01K 7/026 |

(Continued)

OTHER PUBLICATIONS

Computer translation of CN_106092352_A (Year: 2025).*

(Continued)

*Primary Examiner* — Randy W Gibson
(74) *Attorney, Agent, or Firm* — Fitch Even Tabin & Flannery LLP

(57) ABSTRACT

A system and method for determining the type of an analog sensor device in a process control system comprising at least a terminal block unit comprising four connection ports connectable with an analog sensor device, wherein the sensor device to be determined is a 2-wire connection sensor device, a 3-wire connection sensor device, or a 4-wire connection sensor device. The method includes detecting whether: a predefined resistance value is present for a 2-wire connection sensor device, a 3-wire connection sensor device, a predefined resistance value between two predefined pairs of connection ports of the terminal block unit is provided, or a 4-wire connection sensor device is connected to the terminal block unit.

8 Claims, 1 Drawing Sheet

(56)          References Cited

FOREIGN PATENT DOCUMENTS

| EP | 4123275 | A1 | * | 1/2023 | ......... | H01R 13/6683 |
| KR | 20090063246 | A | * | 6/2009 | .............. | G01K 7/16 |

OTHER PUBLICATIONS

Computer translation of KR_20090063246_A (Year: 2025).*
European Patent Office, Extended European Search Report in European Patent Application No. 22158306.5, 7 pp. (Aug. 22, 2022).
Office Action and Search Report issued in corresponding Chinese Application No. 2023101487466; dated Jan. 15, 2026; in Chinese with English translation (20 pages).

* cited by examiner

METHOD FOR DETERMINING SENSOR TYPES AND SENSOR WIRING

CROSS-REFERENCE TO RELATED APPLICATIONS

This patent application claims priority to European Patent Application No. 22158306.5, filed on Feb. 23, 2022, which is incorporated herein in its entirety by reference.

FIELD OF THE DISCLOSURE

The present disclosure invention relates to a method for determining the type of an analog sensor device in a process control system, a corresponding system and a corresponding computer program element.

BACKGROUND OF THE INVENTION

Process control systems are generally known in the prior art. Process control systems comprise several different hardware units, for example, at least one I/O module with several signal conditioning units, a terminal block unit, a power source, a communication interface unit, and a control unit. Process control systems are used among others to control complex production plants, e.g., in process industry or automobile industry. For example, such a process control system was developed by the applicant under the type designation ABB Ability System 800xA Select I/O. When doing commissioning of a process control system and instrumentation the field technician usually has a signal list of connected field devices and sensor units, a topology of the process control system and an engineering tool executed on a computing unit for configuring the process control system or parts of it.

As of today, it is possible to easily integrate field devices, sensors, or actuators into such a process control system that have digital communication capabilities, such as field devices that have HART communication, since the corresponding information can be easily read out from such field devices. However, more simple field devices or sensors, such as so-called thermocouple, resistance temperature detectors, usually such no digital information is available.

It has now become apparent that there is a further need to provide an easy way to commission field devices or sensors that do not have digital communication capabilities. In particular, a simple way to commission temperature sensors, which are typically of a simpler design, should be provided.

BRIEF SUMMARY OF THE INVENTION

In a general aspect, the present disclosure describes a simplified way to commission field devices or sensors that do not have digital communication capabilities. In a more particular aspect, the present disclosure provides a simplified way to commission temperature sensors, which are typically of a simpler design.

According to an aspect of the present disclosure, a method for determining the type of an analog sensor/field device in a process control system is provided comprising at least a terminal block unit comprising four connection ports connectable with an analog sensor device, wherein the sensor device to be determined is a 2-wire connection sensor device, a 3-wire connection sensor device, or a 4-wire connection sensor device, the method comprising the following steps:

(a) detecting whether a predefined resistance value is present for a 2-wire connection sensor device at the connection ports of the terminal block unit provided for the 2-wire connection sensor device;

(b) when a predefined resistance value for a 2-wire connection sensor is detected in step (a), further detecting whether a predefined resistance value is present for a 3-wire connection sensor device at the connection ports of the terminal block unit provided for the 3-wire connection sensor device;

(c) when no predefined resistance value for a 3-wire connection sensor device is detected in step (b), determine that a 2-wire connection sensor device is connected to the terminal block unit;

(d) when a predefined resistance value for a 3-wire connection sensor device is detected in step (b), further detecting whether a predefined resistance value between two predefined pairs of connection ports of the terminal block unit is provided;

(e) when only between one of the two predefined pairs of connection ports of the terminal block unit a predefined resistance value is detected in step (c), determine that a 3-wire connection sensor device is connected to the terminal block unit; and (f) when between two of the two predefined pairs of connection ports of the terminal block unit a predefined resistance value is detected in step (c), determine that a 4-wire connection sensor device is connected to the terminal block unit.

By using the above, exemplary method, any manual effort for the commissioner and the possibility for faults during manual configuration can be reduced. Notably, it is not essential in which order the respective steps are carried out, i.e., the above-mentioned steps can be carried out in any order. The same applies to the optional steps explained in the following.

BRIEF DESCRIPTION OF THE SEVERAL VIEWS OF THE DRAWING(S)

DETAILED DESCRIPTION OF THE INVENTION

Figures 1, 2:
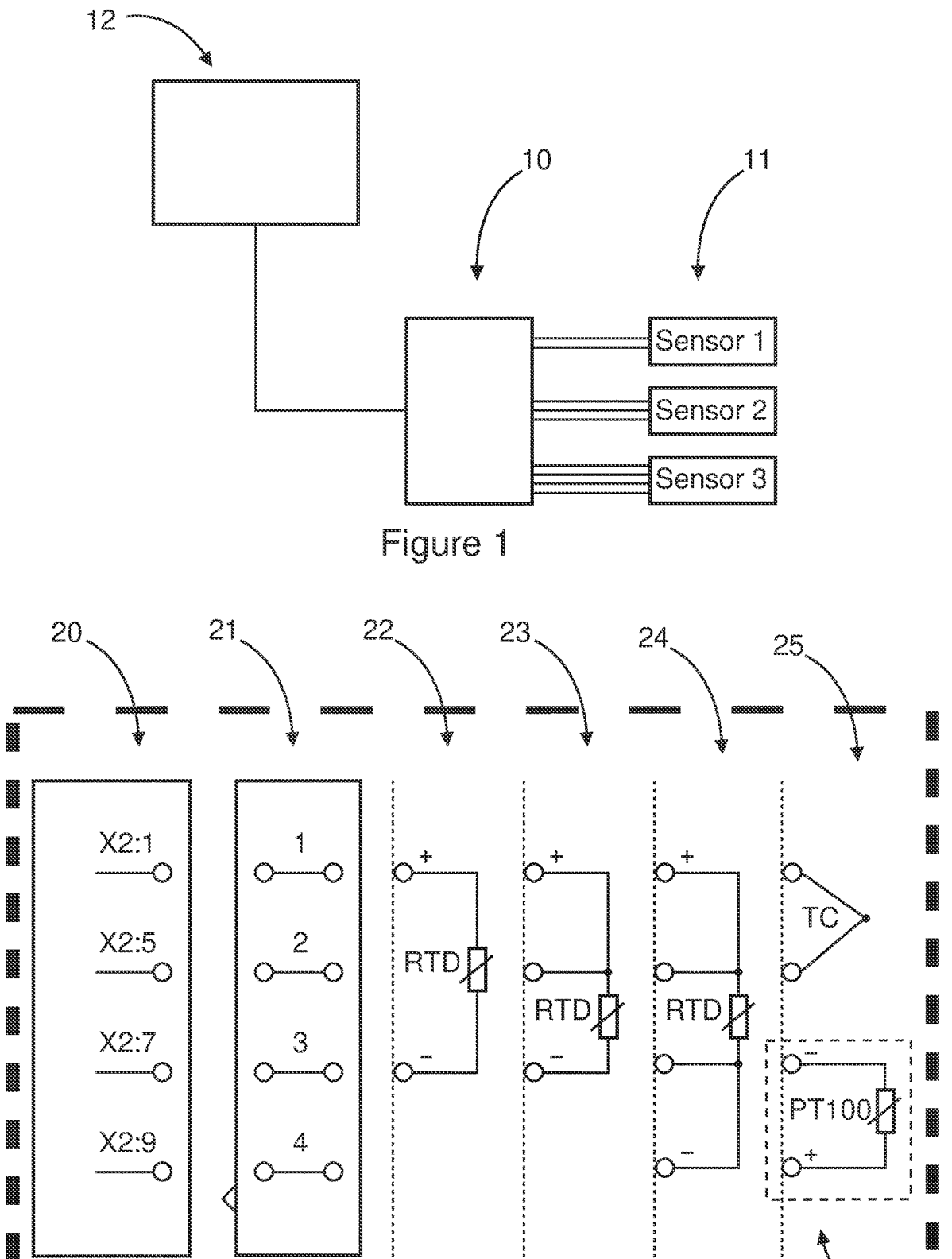
FIG. 1 is a schematic diagram of a part of a process control system according to an embodiment of the present disclosure.
FIG. 2 is a schematic diagram of a signal conditioning unit (SCM) to which a terminal block unit is connected comprising four connection ports connectable with an analog sensor device, in accordance with the disclosure.

In FIG. 1, a schematic view of a part of a process control system according to an embodiment of the present disclosure is shown. The process control system comprises an I/O system 10 to which different sensors/field devices 11 are connected. When doing commissioning, a field technician usually has a signal list of connected field devices/sensor units 11, a topology of the process control system and an engineering tool 12 executed on a computing unit for configuring the process control system or parts of it. Regarding the general structure and the basic functions of such a process control system, reference can be made by way of example to the publications of the applicant on the ABB Ability System 800xA Select I/O, which is generally known to the person skilled in the art.

The preferred method for determining the type of an analog sensor device in a process control system is explained in the following with respect to FIG. 2. In FIG. 2 a signal conditioning module (SCM) 20 is shown which is connected to a terminal block unit 21 comprising four connection ports C1, C2, C3, C4 connectable with an analog sensor device, wherein the sensor device to be determined may be a 2-wire connection sensor device 22, a 3-wire connection sensor device 23, or a 4-wire connection sensor device 24.

For better illustration, the sensors that may be connected to the terminal block unit 21 are shown side by side in FIG. 2. Also shown are the preferred connection ports for the 2-/3-/4-wire sensor devices in the preferred embodiment. For example, the output side of the terminal block unit 21 is connected with the respective input side of the signal conditioning module 20, wherein in the shown preferred embodiment the connection ports of the terminal block unit 21 is connected with the ports of signal conditioning module 20 as follows: C1 with X2:1, C2 with X2:5, C3 with X2:7 and C4 with X2:9. The connection ports of the terminal block unit 21 are preferably configures as follows: C1 and C3 for receiving the wires of a 2-wire sensor/field device; C1, C2 and C3 for receiving the wires of a 3-wire sensor/field device; C1, C2, C3 and C4 for receiving the wires of a 4-wire sensor/field device.

In a step a), it is detected whether a predefined resistance value is present for a 2-wire connection sensor device 22 at the connection ports C1 and C3 of the terminal block unit 21 provided for a 2-wire connection sensor device.

If in step a), a predefined resistance value for a 2-wire connection sensor device 22 is detected, it is further detected in a step b) whether a predefined resistance value is present for a 3-wire connection sensor device 23 at the connection ports C1, C2 and C3 of the terminal block unit 21 provided for a 3-wire connection sensor device.

If in step b), no predefined resistance value for a 3-wire connection sensor device is detected it is determined that a 2-wire connection sensor device 22 is connected to the terminal block unit 21.

If in step b), a predefined resistance value for a 3-wire connection sensor device 23 is detected, it is further detected in a step c) whether a predefined resistance value between two predefined pairs of connection ports of the terminal block unit is provided. In the preferred embodiment, the pairs are C1-C2 (X2:1-X2:5) and C3-C4 (X2:7-X2:9).

If in step c), only between one of the two predefined pairs of connection ports of the terminal block unit 21, here e.g. C1-C2 (X2:1-X2:5), a predefined resistance value is detected, it is determined that a 3-wire connection sensor device 23 is connected to the terminal block unit 21.

If in strep c), between two of the two predefined pairs of connection ports of the terminal block unit, here e.g. C1-C2 (X2:1-X2:5) and C3-C4 (X2:7-X2:9), a predefined resistance value is detected, it is determined that a 4-wire connection sensor device 24 is connected to the terminal block unit 21.

It has to be pointed out that the order of the above explained steps is not essential, i.e., the explained steps can be carried out in any order. The same applies to the optional steps explained in the following.

In this respect, it is preferred that the analog sensor device 22, 23, 24 is a resistance temperature detector (RTD) device or a thermocouple (TC) device 25.

In this respect, it is further preferred that the above-described method further comprises detecting whether a thermocouple device 25 is connected to the terminal block unit 21 by executing a loop supervision test and, in case, the loop supervision test is successful determining that a thermocouple device 25 is connected to the terminal block unit 21.

Notably, the resistance temperature detector device 22, 23, 24 and/or the thermocouple device 25 may be a compensated resistance temperature detector device, wherein it is preferred that it comprises a cold junction compensation, an internal compensation or a fixed compensation by parameter. In this respect, it is preferred that the method further comprises: detecting a cold junction temperature of the compensated resistance temperature detector device; in case, the detected cold junction temperature is within a predefined temperature range, determine that the resistance temperature detector device comprises a cold junction compensation; in case, the detected cold junction temperature is not within a predefined temperature range, determine that the resistance temperature detector device comprises an internal compensation or a fixed compensation by parameter.

The determined information of the sensor device 22 to 26 are provided to the engineering tool 12 which is configured to merge the determined information of the sensor device with provided signal list data comprising information of sensor devices used in the process control system.

As a result, it is preferred with the present disclosure to be able to detect and determine information with respect to 2-wire RTD, 3-wire RTD, 4-wire RTD, 2-wire TC and 2-wire TC with an external CJC.

In the following, a summary of the preferred and preferred advantages of the present disclosure is provided explained: When doing commissioning of an I/O system and instrumentation the field technician usually has: a signal list of connected field/sensor devices e.g., wiring information, device type, device identifier, connected sensor type, etc., a topology of the I/O system, and an engineering tool to configure the I/O System.

As of today, it is possible to read the actual topology from the I/O System. Also, for field/sensor devices with electronics, e.g., HART compatible devices, it is possible to read out the required information for commissioning the I/O system. However, for simple field/sensor devices, e.g., thermocouple or resistance temperature detectors, usually no digital information is available. Still there are various connections, e.g., wirings of the RTD, possible that have to be configured well in the I/O system to make it possible to read correct process information from the field device or sensor.

In accordance with the present disclosure, it is possible to detect/determine the temperature sensor wiring and sensor category during startup and may provide this information to an engineering tool. By means of the following preferred sequence sensor category and wiring (2-wire RTD, 3-wire RTD, 4-wire RTD, TC with CJC) can be determined:

1) Configure an analog-to-digital converter (ADC) to expect a two-wire RTD.
    2) Read data from ADC.
    3) When reading a valid resistance, it is about a 2-/3- or 4-wire RTD
    4) Reconfigure the ADC to expect a three-wire RTD.
    5) Read data from ADC.
    6) When reading a valid resistance, it is about a 3- or 4-wire RTD
    7) Measure Wire-Resistance between X2:1-X2:5 and X2:7-X2:9
    8) When only X2:1-X2:5 has a valid resistance (e.g. <300 Ohm), it is determined that a 3-wire RTD is connected
    9) When both X2:1-X2:5 and X2:1-X2:9 have a valid resistance, it is determined that a 4-wire RTD is connected.

5

6

10) Reconfigure the ADC to expect a TC.

11) Execute a loop supervision test: when it is successful, a TC is determined.

12) Enable digital-to-analog converter (DAC) for a PT100 element.

13) Read the cold junction (CJ) temperature

14) When the cold junction temperature it is in expected range (e.g. −40 . . . 70° C.), a CJC by external PT100 (reference sign 26 in FIG. 2) is determined; when not we either an internal compensation or fixed compensation by parameter is determined.

The determined information may then be provided to the engineering tool 12 which merges the detected information on wiring and sensor category with the signal list data. A commissioner is then able to review the consolidated list. Finally, the engineering tool 12 may also create a configuration for the I/O System based on the detected information.

The present disclosure has been described in conjunction with a preferred embodiment as examples as well. However, other variations can be understood and effected by those persons skilled in the art and practicing the claimed invention, from the studies of the drawings, this disclosure, and the claims. Notably the steps presented can be performed in any order, i.e., the present invention is not limited to a specific order of these steps. Moreover, it is also not required that the different steps are performed at a certain place or at one node of a distributed system, i.e., each of the steps may be performed at a different node using different equipment/data processing units.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

In an embodiment of the method, the analog sensor device is a resistance temperature detector (RTD) device or a thermocouple (TC) device.

In an embodiment of the method, the method further comprises detecting whether a thermocouple device is connected to the terminal block unit by executing a loop supervision test and, in case, the loop supervision test is successful determining that a thermocouple device is connected to the terminal block unit. As described above, the detection and determination of the resistance temperature detector devices is based on the respective resistance values. With respect to the thermocouple devices, on the other hand, the voltage values are preferably used for detection and determination of the thermocouple devises, as they are used in the loop supervision test.

In an embodiment of the method, the resistance temperature detector device and/or the thermocouple device is a compensated resistance temperature detector device, wherein it comprises a cold junction compensation, an internal compensation or a fixed compensation by parameter.

In an embodiment of the method, the method further comprises:

(a) detecting a cold junction temperature of the compensated resistance temperature detector device;

(b) in case, the detected cold junction temperature is within a predefined temperature range, determine that the resistance temperature detector device comprises a cold junction compensation;

(c) in case, the detected cold junction temperature is not within a predefined temperature range, determine that the resistance temperature detector device comprises an internal compensation or a fixed compensation by parameter.

In an embodiment of the method, the determined information of the sensor device are provided to a computing unit which is configured to merge the determined information of the sensor device with provided signal list data comprising information of sensor devices used in the process control system.

In an embodiment of the method, the computing unit is configured to provided configuration data for process control system based on the merged information of the sensor device and the signal list data.

According to a further aspect of the present disclosure, a system for determining the type of an analog sensor device in a process control system is provided comprising at least a terminal block unit comprising four connection ports connectable with an analog sensor device, wherein the sensor device to be determined is a 2-wire connection sensor device, a 3-wire connection sensor device, or a 4-wire connection sensor device, comprising:

(a) a detection unit configured to detect whether a predefined resistance value is present for a 2-wire connection sensor device at the connection ports of the terminal block unit provided for the 2-wire connection sensor device;

(b) a detection unit configured to further detect whether a predefined resistance value is present for a 3-wire connection sensor device at the connection ports of the terminal block unit provided for the 3-wire connection sensor device, in case, a predefined resistance value for a 2-wire connection sensor is detected in step a);

(c) a determination unit configured to determine that a 2-wire connection sensor device is connected to the terminal block unit, in case, no predefined resistance value for a 3-wire connection sensor device is detected in step b);

(d) a detection unit configured to further detect whether a predefined resistance value between two predefined pairs of connection ports of the terminal block unit is provided, in case, a predefined resistance value for a 3-wire connection sensor device is detected in step b);

(e) a determination unit configured to determine that a 3-wire connection sensor device is connected to the terminal block unit, in case, only between one of the two predefined pairs of connection ports of the terminal block unit a predefined resistance value is detected in step c);

(f) a determination unit configured to determine that a 4-wire connection sensor device is connected to the terminal block unit, in case, between two of the two predefined pairs of connection ports of the terminal block unit a predefined resistance value is detected in step c).

In an embodiment of the system, the analog sensor device is a resistance temperature detector (RTD) device or a thermocouple (TC) device.

In an embodiment of the system, the system is further comprising: a determination unit configured to determine whether a thermocouple device is connected to the terminal block unit by executing a loop supervision test and, in case, the loop supervision test is successful determining that a thermocouple device is connected to the terminal block unit.

In an embodiment of the system, the resistance temperature detector device is a compensated resistance temperature detector device, wherein it comprises a cold junction compensation, an internal compensation or a fixed compensation by parameter.

In an embodiment of the system, the system is further comprising:

(a) a detection unit configured to detect a cold junction temperature of the compensated resistance temperature detector device;

(b) a determination unit configured to determine that the resistance temperature detector device comprises a cold junction compensation, in case, the detected cold junction temperature is within a predefined temperature range;

(c) a determination unit configured to determine that the resistance temperature detector device comprises an internal compensation or a fixed compensation by parameter, in case, the detected cold junction temperature is not within a predefined temperature range.

In an embodiment of the system, the system is further comprising: a providing unit configured to provide the determined information of the sensor device to a computing unit, which is configured to merge the determined information of the sensor device with provided signal list data comprising information of sensor devices used in the process control system.

In an embodiment of the system, the computing unit is configured to provide configuration data for process control system based on the merged information of the sensor device and the signal list data.

According to a further aspect of the present disclosure, a computer program element is provided with instructions, which, when executed on computing devices of a computing environment, is configured to carry out the steps of the method as explained above in a system as explained above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for determining a type of an analog sensor device in a process control system comprising at least a terminal block unit comprising four connection ports connectable with an analog sensor device, wherein the sensor device to be determined is a 2-wire connection sensor device, a 3-wire connection sensor device, or a 4-wire connection sensor device, the method comprising the following steps:

a) detecting whether a predefined resistance value is present for a 2-wire connection sensor device at the connection ports of the terminal block unit provided for the 2-wire connection sensor device;

b) when a predefined resistance value for a 2-wire connection sensor is detected in step a), further detecting whether a predefined resistance value is present for a 3-wire connection sensor device at the connection ports of the terminal block unit provided for the 3-wire connection sensor device;

c) when no predefined resistance value for a 3-wire connection sensor device is detected in step b) determine that a 2-wire connection sensor device is connected to the terminal block unit;

when a predefined resistance value for a 3-wire connection sensor device is detected in step b), further detecting whether a predefined resistance value between two predefined pairs of connection ports of the terminal block unit is provided;

d) when only between one of the two predefined pairs of connection ports of the terminal block unit a predefined resistance value is detected in step c), determine that a 3-wire connection sensor device is connected to the terminal block unit; and when between two of the two predefined pairs of connection ports of the terminal block unit a predefined resistance value is detected in step c), determine that a 4-wire connection sensor device is connected to the terminal block unit, wherein the analog sensor device is a resistance temperature detector (RTD) device or a thermocouple (TC) device, wherein the resistance temperature detector device is a compensated resistance temperature detector device, wherein the compensated resistance temperature detector device comprises a cold junction compensation, an internal compensation or a fixed compensation by parameter, and wherein the method further comprises:

detecting a cold junction temperature of the compensated resistance temperature detector device;

when the detected cold junction temperature is within a predefined temperature range, determine that the resistance temperature detector device comprises a cold junction compensation; and when the detected cold junction temperature is not within a predefined temperature range, determine that the resistance temperature detector device comprises an internal compensation or a fixed compensation by parameter.

2. The method according to claim 1, wherein the method further comprises: detecting whether a thermocouple device is connected to the terminal block unit by executing a loop supervision test and, in case, the loop supervision test is successful determining that a thermocouple device is connected to the terminal block unit, wherein the loop supervision test comprises measuring loop-generated voltage to detect whether the thermocouple device is connected to the terminal block unit.

3. The method according to claim 1, wherein the determined information of the sensor device is provided to a computing unit which is configured to merge the determined information of the sensor device with provided signal list data comprising information of sensor devices used in the process control system.

4. The method according to claim 3, wherein the computing unit is configured to provide configuration data for process control system based on the merged information of the sensor device and the signal list data.

5. A system for determining a type of an analog sensor device in a process control system comprising at least a terminal block unit comprising four connection ports connectable with an analog sensor device, wherein the sensor device to be determined is a 2-wire connection sensor device, a 3-wire connection sensor device, or a 4-wire connection sensor device, comprising:

a) a detection unit configured to detect whether a predefined resistance value is present for a 2-wire connection sensor device at the connection ports of the terminal block unit provided for the 2-wire connection sensor device;

b) a detection unit configured to further detect whether a predefined resistance value is present for a 3-wire connection sensor device at the connection ports of the terminal block unit provided for the 3-wire connection sensor device, in case, a predefined resistance value for a 2-wire connection sensor is detected in step a);

c) a determination unit configured to determine that a 2-wire connection sensor device is connected to the terminal block unit, in case, no predefined resistance value for a 3-wire connection sensor device is detected in step b);

a detection unit configured to further detect whether a predefined resistance value between two predefined pairs of connection ports of the terminal block unit is provided, in case, a predefined resistance value for a 3-wire connection sensor device is detected in step b);

d) a determination unit configured to determine that a 3-wire connection sensor device is connected to the terminal block unit, in case, only between one of the two predefined pairs of connection ports of the terminal block unit a predefined resistance value is detected in step c); and a determination unit configured to determine that a 4-wire connection sensor device is connected to the terminal block unit, in case, between two of the two predefined pairs of connection ports of the terminal block unit a predefined resistance value is detected in step c), wherein the analog sensor device is a resistance temperature detector (RTD) device or a thermocouple (TC) device, wherein the resistance temperature detector device is a compensated resistance temperature detector device, wherein the compensated resistance temperature detector device comprises a cold junction compensation, an internal compensation or a fixed compensation by parameter, and wherein the system further comprises:

a detection unit configured to detect a cold junction temperature of the compensated resistance temperature detector device;

a determination unit configured to determine that the resistance temperature detector device comprises a cold junction compensation, in case, the detected cold junction temperature is within a predefined temperature range; and a determination unit configured to determine that the resistance temperature detector device comprises an internal compensation or a fixed compensation by parameter, in case, the detected cold junction temperature is not within a predefined temperature range.

6. The system according to claim 5, further comprising: a determination unit configured to determine whether a thermocouple device is connected to the terminal block unit by executing a loop supervision test and, in case, the loop supervision test is successful determining that a thermocouple device is connected to the terminal block unit, wherein the loop supervision test comprises measuring loop-generated voltage to detect whether the thermocouple device is connected to the terminal block unit.

7. The system according to claim 5, further comprising a providing unit configured to provide the determined information of the sensor device to a computing unit, which is configured to merge the determined information of the sensor device with provided signal list data comprising information of sensor devices used in the process control system.

8. The system according to claim 7, wherein the computing unit is configured to provide configuration data for process control system based on the merged information of the sensor device and the signal list data.

\* \* \* \* \*